United States Patent
Neal et al.

(10) Patent No.: US 6,301,627 B1
(45) Date of Patent: Oct. 9, 2001

(54) METHOD/SYSTEM FOR IDENTIFYING DELAYED PREDETERMINED INFORMATION TRANSFER REQUEST AS BYPASSABLE BY SUBSEQUENTLY-GENERATED INFORMATION TRANSFER REQUEST USING BYPASS ENABLE BIT IN BRIDGE TRANSLATION CONTROL ENTRY

(75) Inventors: Danny Marvin Neal, Round Rock; Steven Mark Thurber, Austin, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/216,548

(22) Filed: Dec. 18, 1998

(51) Int. Cl.[7] .............................. G06F 13/14; G06F 13/18; G06F 13/26; G06F 13/30; G06F 13/34
(52) U.S. Cl. .............................. 710/40; 710/29; 710/36; 710/39; 710/52; 710/244; 709/103; 709/232; 711/145; 711/151; 711/158
(58) Field of Search .............................. 709/1, 100, 102, 709/103, 104, 106, 107, 108, 232, 233, 235; 710/5, 6, 21, 29, 33, 36, 39, 40, 52, 58, 59, 107, 112, 244; 711/145, 150, 151, 158, 167, 168, 169; 712/204, 206, 215, 216

(56) References Cited

U.S. PATENT DOCUMENTS

| 5,125,083 | 6/1992 | Fite et al. ............................. 395/375 |
|---|---|---|
| 5,432,918 | 7/1995 | Stamm ................................. 395/425 |
| 5,471,598 | 11/1995 | Quattromani et al. ............... 395/449 |
| 5,615,402 | 3/1997 | Quattromani et al. ............... 395/800 |
| 5,625,835 | 4/1997 | Ebcioglu et al. .................... 395/800 |
| 5,673,399 | * 9/1997 | Guthrie et al. ....................... 710/128 |
| 5,694,556 | * 12/1997 | Neal et al. ............................. 710/128 |
| 5,740,398 | 4/1998 | Quattromani et al. ............... 395/444 |
| 5,906,000 | * 5/1999 | Abe et al. ............................. 711/151 |
| 5,953,538 | * 9/1999 | Duncan et al. ........................ 710/22 |
| 5,961,623 | * 10/1999 | James et al. .......................... 710/113 |
| 6,014,721 | * 1/2000 | Arimilli et al. ...................... 710/129 |
| 6,014,737 | * 1/2000 | Kurata ................................. 712/219 |
| 6,076,130 | * 6/2000 | Sharma ................................ 710/129 |
| 6,108,741 | * 8/2000 | MacLaren et al. .................. 710/128 |
| 6,138,192 | * 10/2000 | Hausauer ............................. 710/100 |
| 6,163,815 | * 12/2000 | Fields, Jr. et al. ...................... 710/6 |
| 6,167,476 | * 12/2000 | Olarig et al. ......................... 710/128 |
| 6,175,888 | * 1/2001 | Guthrie et al. ....................... 710/129 |

\* cited by examiner

Primary Examiner—Thomas Lee
Assistant Examiner—Tanh Nguyen
(74) Attorney, Agent, or Firm—Robert V. Wilder; Leslie A. Van Leeuwen

(57) ABSTRACT

A method and apparatus is provided in which I/O data is tagged to identify an ordering of data transfer requests relative to other data transfer requests. Write and Read transaction requests are tagged for ordering relative to previous write requests. Current read and write transaction requests are selectively allowed to bypass earlier write transaction requests which have been temporarily delayed in transfer. In one embodiment, the bypass occurs in a bridge buffer positioned between I/O devices and a system memory. In another embodiment, the methodology is applied where a split read or write transaction includes reserved bits in the attribute fields which are utilized to indicate if the transaction is allowed to bypass previous write transactions.

9 Claims, 3 Drawing Sheets

METHOD/SYSTEM FOR IDENTIFYING DELAYED PREDETERMINED INFORMATION TRANSFER REQUEST AS BYPASSABLE BY SUBSEQUENTLY-GENERATED INFORMATION TRANSFER REQUEST USING BYPASS ENABLE BIT IN BRIDGE TRANSLATION CONTROL ENTRY

FIELD OF THE INVENTION

The present invention relates generally to information processing systems and more particularly to an improved information transfer methodology in a computer related environment.

BACKGROUND OF THE INVENTION

As the sheer number of computer systems and computer system applications continues to increase, there is also an increasing need for improved and more efficient data management and data processing techniques. Increased processing speeds and bandwidth capabilities within computer systems require enhanced control techniques in order to minimize traffic congestion and optimize data flow efficiency.

Generally, elements in the path of data flow from an I/O (input/output) system to system memory can neither re-order write operations nor re-order read operations with respect to write operations. When data is sent or transferred from one device to another in a computer system, the data packages are sequenced in the order sent. This ordering process, which is enforced and required for example, by system bus architectures, (such as the PCI Local Bus Specification, Rev. 2.1, Jun. 1, 1995, which is included herein by reference), may cause performance limitations in the system.

In the past, architectures have not made it possible for I/O devices to inform the system which operations need to be ordered and which ones do not. So, for example, operations, where programs are being paged out from system memory to a DASD (direct access storage device), frequently at multiple pages at a time, do not need to have each data block that is read from system memory to be ordered with respect to write operations to system memory. The operations are independent due to the fact that the page is not being modified at the same time it is being paged out. In general, data being read by an I/O device will not be changing. One place where this might not be true is in read operations with I/O control block areas where there is the likelihood that read operations may need to be kept in order with write operations to that same area, otherwise improper operations may result. Further, where programs are being brought into system memory from a DASD, each separate data block write operation from the DASD does not need to be ordered with respect to one another so long as all of the transfers complete before the I/O operation is complete. On the other hand, write operations with I/O control block areas will most likely need to be kept in order with one another in order to avoid any improper operations which might result.

Thus, there is a need for an improved information processing methodology and system in which information is more efficiently transferred between system devices during information processing transactions.

SUMMARY OF THE INVENTION

A method and apparatus is provided in which I/O data is tagged to identify an ordering of data transfer requests relative to other data transfer requests. Write and Read transaction requests are tagged for ordering relative to previous write requests. Current read and write transaction requests are selectively allowed to bypass earlier write transaction requests which have been temporarily delayed in transfer. In one embodiment, the bypass occurs in a bridge buffer positioned between I/O devices and a system memory. In another embodiment, the methodology is applied where a split read or write transaction includes reserved bits in the attribute fields which are utilized to indicate if the transaction is allowed to bypass previous write transactions.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

In an exemplary embodiment, where 32-bit I/O devices must access 64-bit address spaces, it is necessary to have some sort of translation mechanism in the bridges to translate the 32-bit to 64-bit address. If this is not to be a fixed translation (which has many restrictions) then a dynamic method must be used as in the case of PowerPC™ platforms. In these systems, a Translation Control Entry (TCE) is associated with each 4 KB block of address space and this determines which I/O bus 4 KB page will access which system memory 4 KB page. TCEs also use some of their bits for address translation and other bits for control. The present embodiment uses two of the spare TCE bits as a communication path between I/O device driver code and the bridge hardware which uses the TCEs. In an exemplary embodiment, these ordering bits are referred to as WBW (Write Bypass Write) bit and RBW (Read Bypass Write) bit. A WBW bit, when set indicates to a bridge circuit for example, that in order to increase performance, that all write operations to that page are allowed to be re-ordered relative to one another and with respect to other write operations going on in the system at the same time. Similarly, a RBW bit when set indicates, to a bridge circuit for example, that in order to increase performance that all read operations to that page are allowed to be re-ordered relative to write operations, and all other operations going on into the system at the same time.

For example, when a page of data or instructions is being paged in, or written in, to system memory from an I/O device, the page is broken down by the I/O device into multiple block write operations. When the host bridge goes to write one of the blocks to system memory, the memory controller may signal that the write operation cannot be accepted at that time. This might occur, for example, due to a processor that has to flush a cache line before the write operation can occur or because a memory bank is busy at the time. If the WBW bit is set for another block of data in the host bridge, that block write can be tried instead of immediately retrying the previous write operation. The second block write may occur immediately, for example, due to its data not being cached (a processor doesn't hold up the operation) or because the memory bank addressed is available.

Similarly, when an I/O device follows multiple write operations with a read request to obtain, for example, control block information, if the RBW bit is set for the system memory read request in the host bridge, that read request can be tried instead of immediately retrying the previous write request. Improved performance can be obtained by the bridge by allowing read requests which have the RBW bit set, to bypass queued write requests which have been temporarily stalled before continuing to attempt the write operations that are queued. In that event, the latency of the memory read access can be reduced thereby allowing significant performance improvement.

Figure 1:
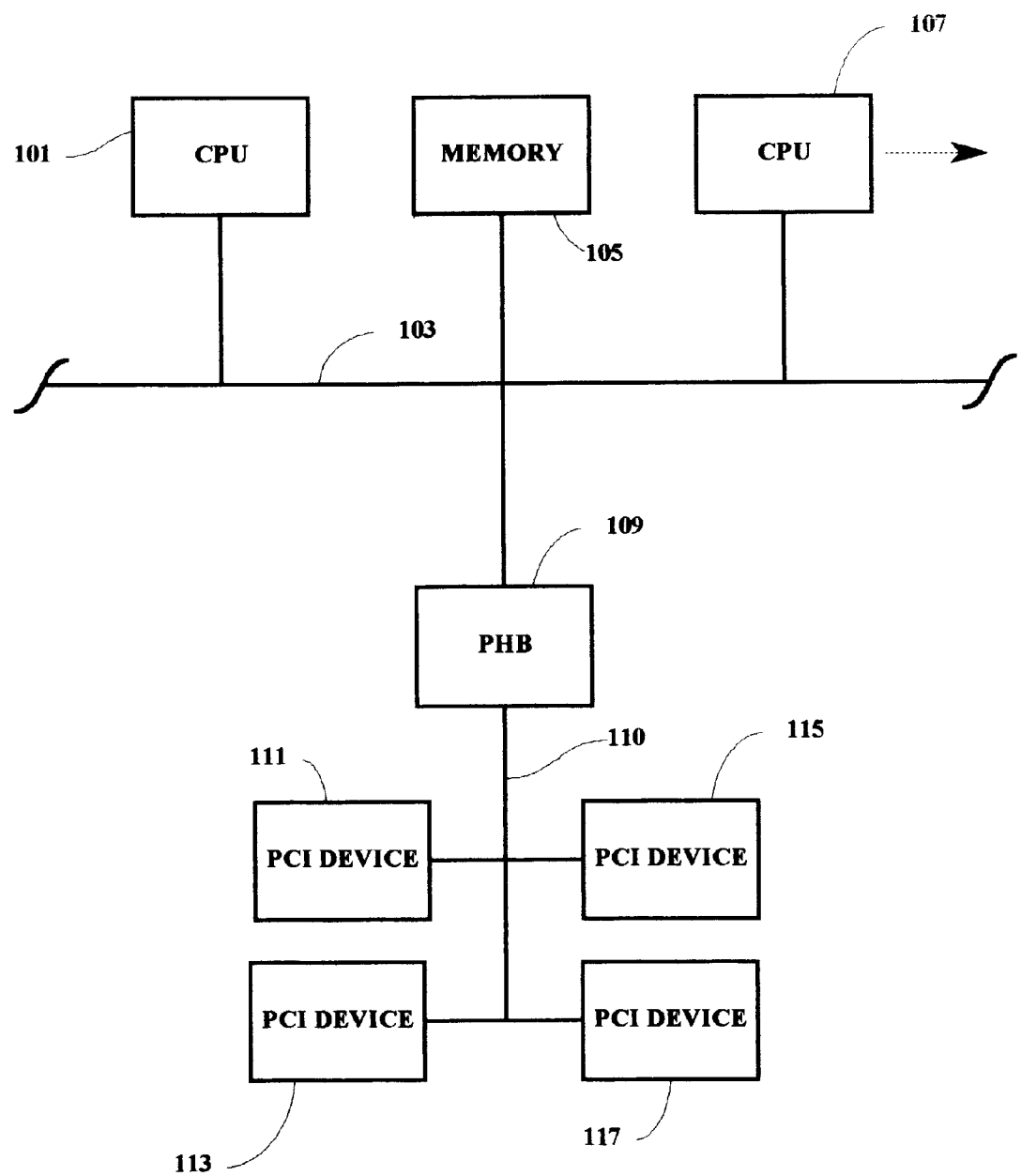
FIG. 1 is a block diagram of a typical computer related information processing system in which an exemplary embodiment of the present invention may be implemented.

With specific reference to FIG. 1, the various methods discussed herein may be implemented within a typical computer system which may include one or more computers or workstations in various combinations. An exemplary hardware configuration of a computer system which may be used in conjunction with the present invention is illustrated in FIG. 1 and includes a processor device 101, such as a conventional microprocessor, and a number of other units interconnected through a system bus 103, which may be any host system bus. The system bus may have one or more additional processors connected to the bus such as processor 107. It is noted that the processing methodology disclosed herein will apply to many different bus and/or network configurations. The bus 103, as well as any of the other busses illustrated, may be extended as shown to include further connections to other computer systems, workstations or networks, and other peripherals and the like. The computer system shown in FIG. 1 includes a local bus 103 and system memory 105. The system bus 103 is connected through a PCI (Peripheral Component Interconnect) Host Bridge circuit 109 ("PHB") to a PCI bus 110. In the illustrated example, there are four PCI devices 111, 113, 115 and 117 connected to the PCI bus 110. PCI devices 111, 113, 115, and 117 are also hereinafter interchangeably referred to as "adapters", "adapter devices" and "I/O adapters". During normal system operation, information, including data and/or instructions, are processed and transferred between I/O adapters or PCI devices, as well as between adapter devices and system memory 105.

As hereinbefore noted, TCEs are utilized in some server systems to allow address translation of an I/O adapter DMA (direct memory access) read and write accesses to system memory. Each 4 K page that the adapter can access has its own TCE. The TCE provides the address translation by providing an address offset that is applied to the transaction. When a DMA access occurs at the PHB 109, the address of the transaction is utilized to access the appropriate TCE in the PHB 109. The TCE may already be cached in the PHB, or the TCE may have to be fetched from memory. Reserved bits in the TCE field are utilized, in accordance with the present invention, to indicate whether bypass is allowed.

When the TCE is set up for specific pages in memory for an adapter, a WBW (write bypass write) bit and/or RBW (read bypass write) bit are set in the TCEs for pages in which bypass ordering is allowable. When an access from a specific adapter enters a bridge such as PHB 109, if the address of the transaction accesses a TCE which indicates with the WBW and/or RBW bits that bypass is allowed, then corresponding WBW and/or RBW bits in the bridge buffers can be set appropriately in the buffers where the transaction is buffered. If the WBW and/or RBW bit is set in the buffer, then that transaction may be allowed to bypass any previous write transactions whenever a write transaction that is at the head of the transaction queue in the bridge has been retried on the bus. As used herein, the words "retry" or "retried" refer to a PCI transaction termination without data. This is an indication by the target to the requesting device to attempt the transaction again later.

Figure 2:
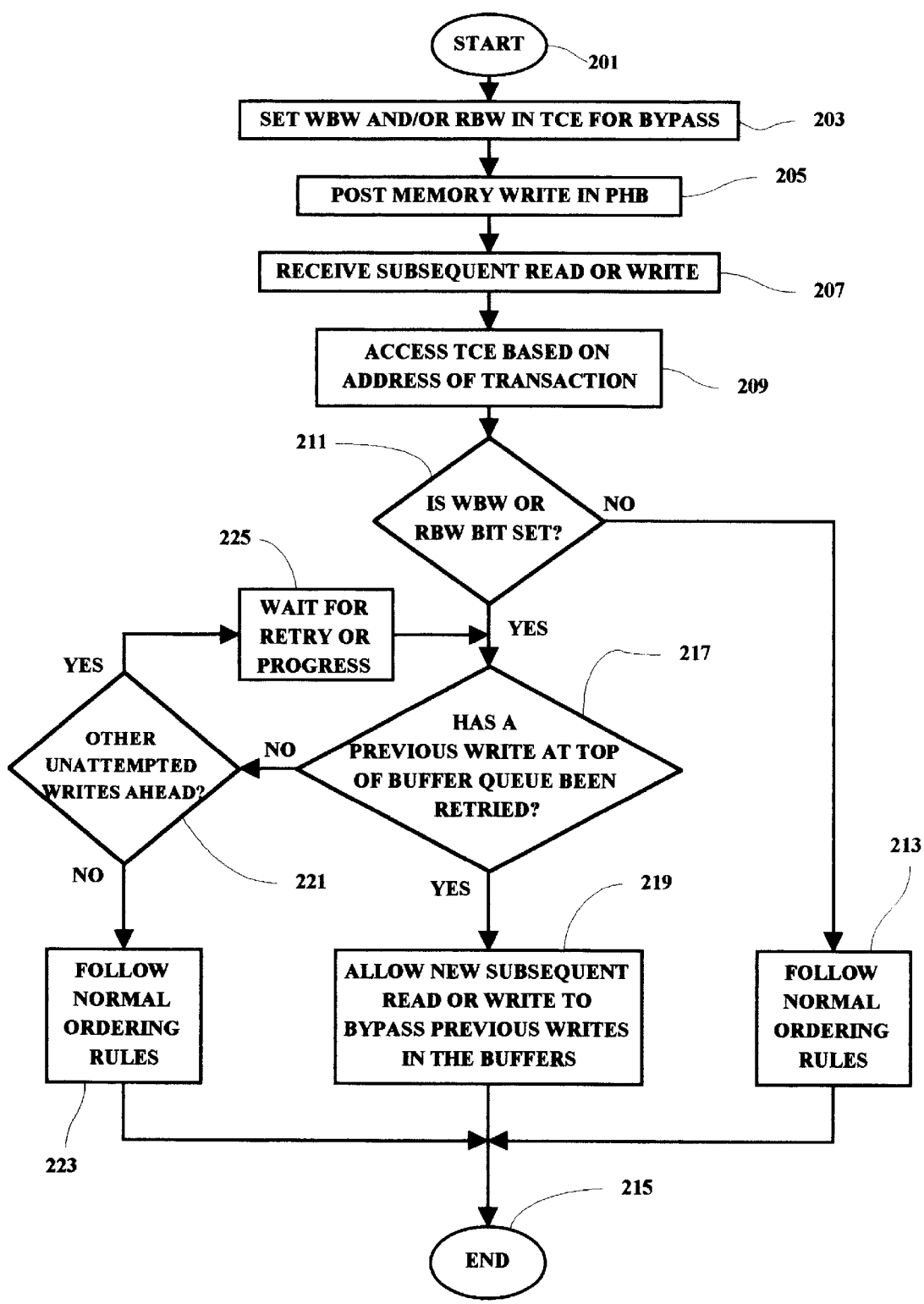
FIG. 2 is a flow chart illustrating one operational sequence in an exemplary embodiment of the present invention.

This methodology is illustrated in detail in FIG. 2. As shown in FIG. 2, the process begins 201 by setting a WBW and/or RBW bits 203 in the TCE for bypass as appropriate. Next, a memory write operation is posted in PHB buffers 205 and when a subsequent read or write operation request is received at the PHB bridge buffers 207, the TCE is accessed 209 based upon the address of the received transaction request. A check is then made to determine if the WBW or the RBW bits have been set 211. If neither of those bits have been set for the posted write request 211, then normal ordering rules are followed 213 relative to the received read or write operation request and the process ends 215. If, however, the WBR bit or RBW bit has been set 211, then a check is made to determine if a previous write operation request at the top of the PHB buffer queue has been retried 217. If the previous write operation request at the top of the queue has been retried on the system bus and have been unable to move out of the bridge buffers for any reason, then the new subsequent read or write operation request is allowed to bypass the previous write operation requests in the buffers 219 and be processed thereby providing a more efficient data transfer operation.

If a previous write operation at the top of the PHB buffer queue has not yet been retried 217, then a check is made to determine if there are other requested write operations ahead of the new write request that have not yet been attempted 221. If not, then the normal ordering rules for the processing of read and write operation requests are followed 223 and the process is ended for the particular operation being processed. If there are other un-attempted write operation requests ahead in the PHB buffer queue, then the bypass operation will wait 225 until the previous write operation requests in the buffer queue have been executed on the bus or are retried on the bus 217 at which time, if a previous write receives a retry on the bus, the new or current read or write operation request will be allowed to bypass previous writes in the buffers 219.

The disclosed methodology may also be applied to provide split read transactions capability for an I/O bus such as a PCI bus. The split read transactions include reserved bits in the attribute fields. In the case of split read requests, a reserved bit is utilized in the attribute field in the example to indicate if the transaction is allowed to bypass previous write transactions (RBW bit). Whenever a split read transaction is accepted in a bridge buffer, the RBW bit is stored in the buffer to indicate that the transaction is allowed to bypass previous write transactions buffered in the bridge. Similarly, if a split write capability were added in a manner similar to the split read which also included a bypass bit in the attribute field (WBW bit), then such a bit could be utilized to allow subsequent writes to bypass previous writes if the WBW bit were set.

Figure 3:
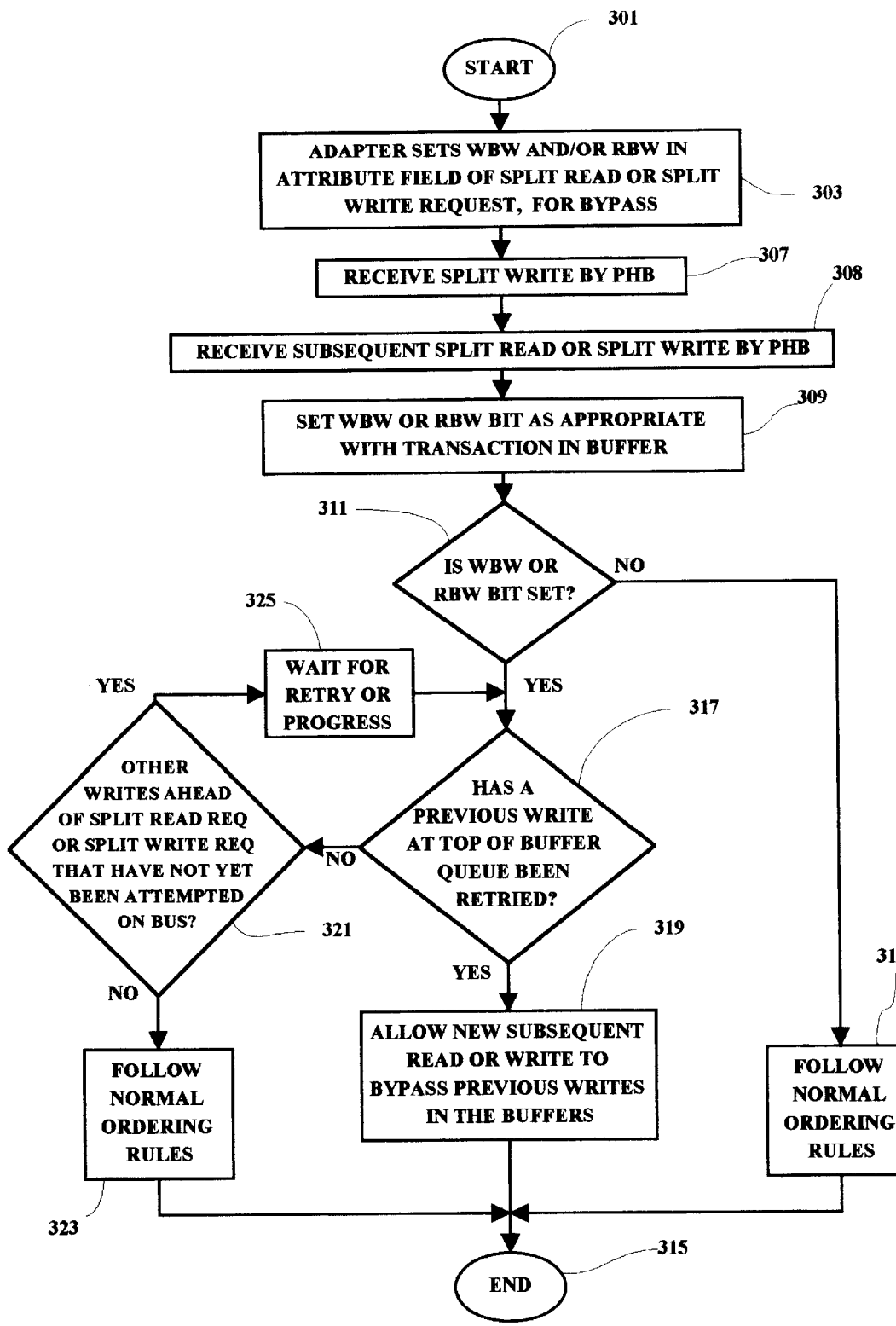
FIG. 3 is a flow chart illustrating another operational sequence in a second exemplary embodiment of the present invention.

The split transactions capability is illustrated in FIG. 3. As shown in FIG. 3, when the process starts 301 the appropriate adapter sets a WBW or RBW bit in the attribute field of a split read or split write request for bypass as appropriate 303. Thereafter, a split write is received by the PHB 307. Next, a subsequent split read or split write is then received 308 by the PHB bridge circuit and the WBW or RBW bit is set 309 as appropriate with the transaction in the PHB bridge. Next a check is made to determine if either the WBW or RBW bit is set 311. If not, then normal ordering rules are followed 313 and the process ends. If either the WBW or RBW bit has been set 311, then another check is made to determine if a previous write at the top of the buffer queue has been retried 317. If a previous write at the top of the PHB buffer queue has been retried 317 then the new subsequent read or write transaction request is allowed to bypass the previous writes in the buffers and be processed. If a previous write transaction request at the top of the queue has not been retried 317, then a check is made to determine if there are other writes ahead of the current split read request or split write request that have not yet been attempted on the system bus 321. If there are not any such transaction requests, then normal processing rules will apply 323 and the process is ended 315. If, however, there are other writes ahead in the PHB buffer queue that have not yet been attempted on the PHB system bus, then the process will wait 325 for those writes to either execute on the system bus or receive a RETRY. If a previous write operation now at the top of the queue receives a RETRY 317, then allow the current transaction request to bypass the previous write requests 319 before ending 315.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for transferring information from a first device to a second device through an intermediate bridge circuit in a computer system, said method comprising:

identifying a predetermined information transfer request which is allowed to be bypassed by subsequently generated information transfer requests;

enabling a subsequently generated information transfer request to bypass said identified predetermined information transfer request if said predetermined information transfer request is delayed between said first device and said second device; and wherein said identifying is accomplished by setting a bypass enable bit in a translation control entry associated with said bridge circuit.

2. The method as set forth in claim 1 and further including said first device setting a bypass enable bit in an attribute field of said predetermined information transfer request.

3. The method as set forth in claim 1 wherein said predetermined information transfer request is a write request.

4. The method as set forth in claim 3 wherein said subsequently generated information transfer request is a write request.

5. The method as set forth in claim 3 wherein said subsequently generated information transfer request is a read request.

6. The method as set forth in claim 1 wherein said subsequently generated information transfer request is a write request.

7. The method as set forth in claim 1 wherein said subsequently generated information transfer request is a read request.

8. An information transfer system comprising:

a first device;

a second device;

a bridge buffer device connected between said first device and said second device, said information transfer system including means selectively operable for identifying a predetermined information transfer request which is allowed to be bypassed by a subsequently generated information transfer request, said information transfer system being operable for enabling a subsequently generated information transfer request to bypass said predetermined information transfer request within said bridge buffer device between said first and second devices; and wherein said identifying is accomplished by setting a bypass enable bit in a translation control entry associated with said bridge buffer device.

9. The information transfer system as set forth in claim 8 and further including a PCI bus connected between said first and second devices.

* * * * *